Oct. 25, 1960  R. W. HENNING ET AL  2,957,175
RECEPTOR FOR POSITIONING DISCS AND THE
LIKE AT THE MUZZLE OF THE BARREL
OF EXPLOSIVELY ACTUATED TOOLS
Original Filed Aug. 29, 1955
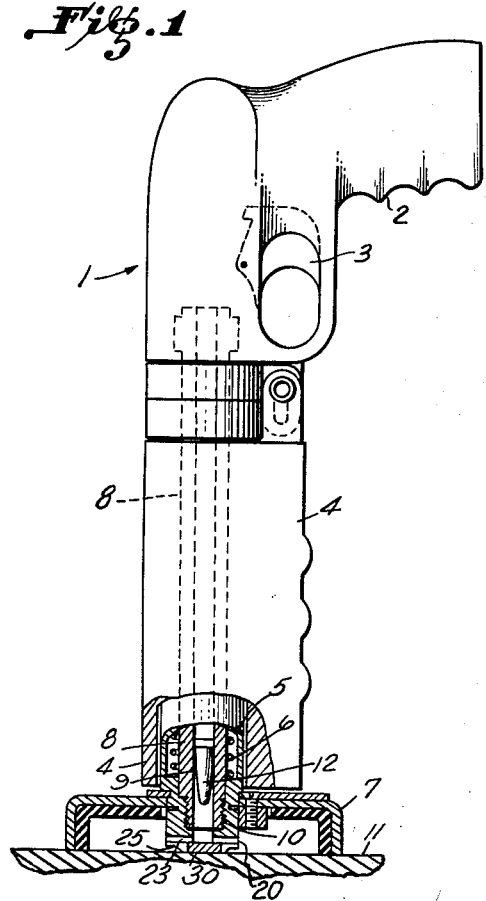
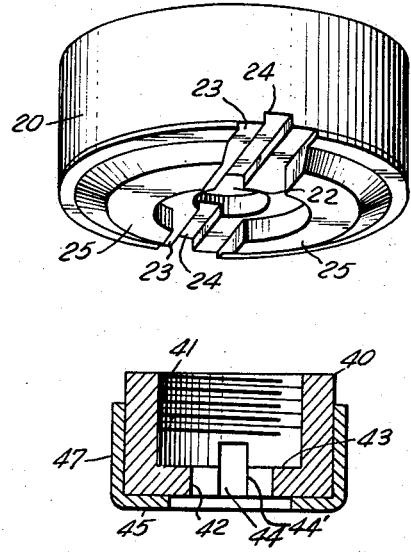
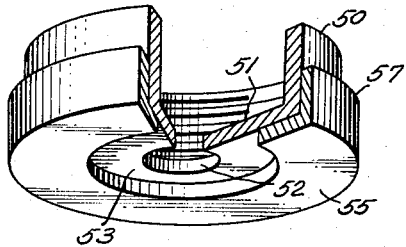
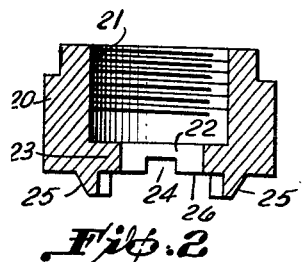
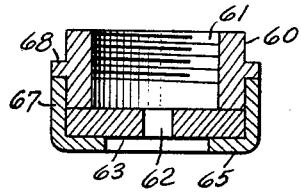
INVENTORS
Robert W. Henning
Rowland J. Kopf
BY
ATTORNEYS

# United States Patent Office 2,957,175
Patented Oct. 25, 1960

2,957,175

RECEPTOR FOR POSITIONING DISCS AND THE LIKE AT THE MUZZLE OF THE BARREL OF EXPLOSIVELY ACTUATED TOOLS

Robert W. Henning and Rowland J. Kopf, Rocky River, Ohio, assignors, by mesne assignments, to Olin Mathieson Chemical Corporation, a corporation of Virginia Original application Aug. 29, 1955, Ser. No. 531,102, now Patent No. 2,790,173, dated Apr. 30, 1957. Divided and this application Nov. 23, 1956, Ser. No. 626,797

8 Claims. (Cl. 1—44.5)

This invention relates to a fastener driving tool and more particularly to an explosive operated tool for driving studs or pins into steel, concrete, masonry and the like.

This application is a division of co-pending application Serial No. 531,102 filed August 29, 1955, now Patent No. 2,790,173 granted April 30, 1957.

In the operation of driving fasteners by high velocity projection using a tool of the type including a fastener projecting barrel, discs or washers of metal such as steel are often positioned at the muzzle end of the barrel. Such discs and washers serve for limiting the depth of penetration of the fastener and particularly of fasteners with an enlarged head, for minimizing spalling produced at the point of penetration, for improving the fastening of wooden members particularly, and for aiding in driving the fasteners straight when washers are employed. These discs or washers, which are quite widely used in many applications of such tools, are temporarily retained at the muzzle by insertion into a socket or counterbore thereat of larger diameter than the barrel bore aided by the application of a little grease to the disc or by provision at the muzzle of some kind of detent projecting inwardly into the socket as from a spring to hold the discs. Such heretofore known schemes for retention of the discs, however, have proved unreliable or very difficult and inconvenient especially when the tool has been put to prolonged usage and heat and dirt have begun to accumulate and to interfere with retentivity of the disc in the retainer. Aside from the usual difficulty experienced with heretofore known disc retainers another serious disadvantage has been the danger attending operation of such tools whenever discs have failed to seat or have slipped out of proper seating in the socket after loading of the tool. The displaced discs tend to cause the fasteners upon firing of the tool to be misaligned with the surface into which they are to be driven and to ricochet.

Therefore one of the objects of this invention is to provide a new and improved disc retainer for the muzzle of the barrel of explosive actuated stud driving tools. Another object is to provide a disc or washer retainer characterized by greater reliability and safety. Another object is the provision of a novel magnetic disc retainer for fastener driving tools.

Other objects and advantages will be obvious from the following description of various embodiments of the invention when taken in connection with the accompanying drawing in which:

Figure 1 is a side elevational view of a typical driving tool with certain parts broken away to show it partially in section to better illustrate a preferred embodiment of this invention in connection with the tool, shown pressed against a work surface and ready for operation;

Figure 2 is an enlarged view of the disc receptor of Figure 1 in cross section;

Figure 3 is a perspective view of the disc receptor shown in Figure 1;

Figure 4 is a cross sectional view of another embodiment;

Figure 5 is a perspective view of still another embodiment with a portion broken away to show the structure in cross section; and Figure 6 is a cross sectional view of a still further embodiment.

In accordance with this invention for the attainment of these objects, there is provided at the muzzle of a fastener driving tool a magnetic receptor constructed in such a way that it serves to retain a work piece such as a disc or washer at the muzzle. The receptor is recessed in such a way that it will function only when the disc or washer is fully seated in proper alignment with respect to the bore of the barrel. The disc receptor of this invention includes a member magnetized either longitudinally or preferably transversely and is orificed for passage of an explosive driven stud or pin. The receptor is longitudinally recessed, which is to say in the direction of the axis of the bore of the barrel, for reception therein of the discs or washers with alignment coaxially with the barrel bore. The receptor is provided with a protruding disc standoff portion which ordinarily surrounds the recess and forms its periphery or rim. The purpose of this protruding portion is for interfering with the magnetic holding action on the disc unless the disc is properly seated in the recess. In one embodiment this protruding portion is formed of non-magnetic material. But preferably the protruding portion or standoff is integral with the magnetic member and takes the form a segmented rim extending ahead of the strongest magnetic field and constituting the side wall of the recess formed in the magnetic member. In this preferred embodiment the magnetic member is transversely magnetized and has a primary gap disposed diametrically to intersect with the face of the member adjacent the recess bifurcating the member and separating the front face into opposite poles. The standoff rim consists of an arcuate portion in each of these pole faces separated by a secondary gap much wider than the primary gap. This rim appendage functions in the same manner as the non-magnetic rim by which it may be replaced but has the advantage of being integral with the receptor. In the preferred embodiment the receptor is a single piece. In the embodiment wherein the magnetic member is longitudinally or axially magnetized in the direction of the axis of the bore of the barrel, the rim is always formed of non-magnetic material such as stainless steel, for example, which will be capable of resisting the wear to which the receptor is subjected as it is repeatedly put into abutment with the work surface.

In general the disc retainer or receptor of this invention is especially adapted for attachment or fitting to the muzzle end of a tool barrel as an accessory in the form of an internally threaded ring member. The tool, for example, may be of the type 1 shown in Figure 1 and disclosed in all detail in the copending application of Rowland J. Kopf et al., Serial No. 355,034, filed May 14, 1953, now Patent No. 2,945,236 granted July 19, 1960, to which reference should be made for parts and operations not described herein. Such a tool includes means for manipulating it manually such as the handle 2 and means for setting it off manually such as the trigger 3. The tool 1 also includes a barrel housing 4 in which there is mounted a shield tube 5 for telescopic movement with respect to the housing 4. Tube 5 carries a hollow missile and fragment confining shield or guard 7 the periphery of which serves to line up the barrel squarely with respect to the surface of the body 11 into which a fastener 12 is to be projected from the bore 9 of the barrel 8. Shield tube 5 and the tool shield 7 are urged toward the muzzle of the barrel by means of a shield spring 6 carried between the tube 5 and the barrel 8. The shield 7 and its tube 5 are confined on the barrel 8 by means of some type of attachment screw threadedly mounted on the muzzle of the barrel 8 at the threads 10 and extending outwardly from the barrel 8 sufficiently to abut with the assembled shield 7 and the tube 5.

In the embodiment of the invention shown in Figures 1 to 3 the disc receptor 20 takes the form of a muzzle attachment having internal threads 21 for engagement with the threads 10 of the barrel 8. The attachment is axially orificed at 22 so that when it is screw threadedly attached to the threaded muzzle of the barrel 8, orifice 22 is aligned with the bore 9 of the tool barrel to enable passage through receptor 20 of a fastener such as a pin or stud 12. The body of the receptor 20 is magnetized transversely to the axis, i.e. diametrically, and the front facing portion 23 on opposite sides of the orifice 22 is formed with a primary slot 24 which makes of the receptor 20 a U-shaped magnet with pole faces at opposite portions of front face 23 adjacent the slots 24 and with an orifice 22 at the yoke of the magnet. The front portion 23 is provided on each side of the slots 24 with forwardly protruding arcuate rim portions 25 separated at the ends by a secondary gap 26 of greater width than the primary gap 24 between the pole faces formed at the front portion 23. Between them the rim portions 25 form a circular recess for receiving a circular disc or washer 30, Figure 1.

In operation, with the disc adapter of this embodiment attached to the muzzle of the tool barrel 8, the tool operator brings a disc 30 to the recess between arcuate rims 25 integrally formed on receptor 20. If the operator places the disc 30 with proper seating in the recess the magnetic force acting in the front portion 23 across the gaps 24 acts to retain the disc 30 in the recess against the surfaces of the portion 23 forming the bottom of the recess. However, if the disc is not placed in the recess with the full seating the rims 25 act as magnetic standoff members for one side or all of the disc 30 so as to displace it from the intense magnetic field acting across the primary gap 24. As a result the improperly seated disc 30 is subjected only to a greatly diminished magnetic holding force and will not be retained at the muzzle of the tool. This undesirable condition will be immediately detected by the operator who will then be prompted to manipulate the disc until it is properly seated in the recess in the magnetic retainer at the muzzle of the barrel or to insert another disc because the improperly seated one has fallen from the tool muzzle.

In the embodiment shown in Figure 4 the receptor consists of a body 40 internally threaded at 41 for attachment to the threads 10 of the tool barrel 8. The body has a front end portion 43 axially orificed at 42 so that when it is screw threadedly attached at the muzzle, orifice 42 is aligned with the bore 9 of the tool barrel to enable passage of a fastener such as 12. Body 40 is magnetized transversely to the axis, i.e. diametrically, and the front portion 43 on opposite sides of the orifice 42 is slotted at 44 which makes the body 40 a U-shaped permanent magnet with pole faces at the opposing surfaces 44' of the front portion 43 adjacent the slots 44. Mounted on the permanently magnetized body 40 is a non-magnetic front face rim 45 having an axially extending collar or flange 47 for securing rim 45 on the body 40. Rim 45 extends inwardly across the front portion of the receptor body 40 so as to leave a recess adjacent front portion 43 for receiving and holding discs such as 30 with proper alignment with the orifice 42 and the bore 9 of the barrel 8, provided the disc is properly seated in the recess against the front portion 43. Rim 45 constitutes standoff means which prevents the disc 30 from being magnetically retained if it is emplaced in such a way as to permit any part of the rim 45 to intervene between the front portion 43 and any part of the disc 30. Such intervention and resulting prevention of magnetic holding is obtained when the disc is placed entirely on rim 45 or when the disc is tilted so that one part of it is in the recess while the other part rests against an intervening part of rim 45.

In the embodiment of this invention shown in Figure 5 the receptor consists of a permanently magnetized body 50 and of a pole face rim 55 made of any suitable non-magnetic material such as stainless steel. Rim 55 is mounted on body 50 with the aid of flange 57 and extends partially across the front portion 53 of the magnetic body internally threaded at 51 and axially orificed at 52 for passage of the fastener such as 12. In this embodiment body 50 is axially magnetized. Rim 55 as in the pervious embodiment operates as a standoff means for preventing close magnetic spacing between the disc 30 and pole face 53 of the body 50 unless the disc is fully seated in the recess formed by the rim 55 ahead of the orifice 52.

In the embodiment of Figure 6 the receptor consists of a ring member 60 internally threaded at 61 for attachment to the threads 10 at the muzzle of the barrel 8. Positioned on the front end of the member 60 is a permanently magnetized ring 63. This ring advantageously is made of a special alloy, formed of compacted and sintered metal powder and characterized by good remanace, high retentivity and high coercive force, but unfortunately, often by brittleness. It is magnetized in the direction of the thickness, i.e. in the direction of the axis of the barrel. Ring 63 is orificed at 62 for passage of a fastener such as 12 as it is ejected from the bore 9 of the tool barrel 8. Ring 63 is retained on member 60 with the aid of a pole face rim 65 which extends around the orifice 62 with sufficient spacing to form a recess for reception of a disc 30 with sufficient standoff spacing in the axial direction that the magnetic attraction of the ring magnet 63 will be incapable of retaining the disc 30 at the muzzle of the tool unless the disc is fully seated in the recess within the confines of the rim 65 which is mounted on member 60 with the aid of flanges 67. Rim 65 is of any suitable non-magnetic material such as stainless steel preferably because of its ability to withstand being struck again and again without cracking as compared to most permanent magnetic materials and without wearing excessively. Member 60 may be provided with a circumferentially extending flange 68 for the purpose of isolating the axial extension 67 of rim 65 from the forces which are applied to the receptor as a result of the action of spring 6 by the assembled shield 7 and its tube 5 when the receptor is attached to the muzzle of the barrel 8 in the type of tool shown in Figure 1.

It is ot be understood that although this invention has been described in connection with circular discs and washers, it is adapted for retention at the muzzle of other work pieces of various shapes through which the explosive propelled stud is to pass. It will be also understood that further embodiments, modifications and changes may be made by those skilled in the art in the specific embodiments described and illustrated without departing from the spirit and scope of this invention as set forth in the appended claims.

What is claimed is:

1. In an explosive actuated stud driving tool having a barrel through which a stud is projected into a work surface, a receptor for positioning discs, washers and the like work pieces at the muzzle of said barrel comprising a permanent magnet mounted at the muzzle of said barrel, means for replaceably attaching said receptor in the form of mating threads on one end of said magnet and said muzzle, said magnet having an orifice in alignment with the bore of said barrel for passage of a stud through said magnet from said one end to an opposite end, and a non-magnetic protective rim mounted on said magnet at said opposite end to extend at least in part ahead of said magnet radially spaced from said orifice, said rim and magnet forming a recess at the muzzle of said barrel capable of magnetically retaining said piece at said opposite end opposite the muzzle provided said piece is positioned within said recess within the confines of said rim.

2. The receptor of claim 1 wherein the magnet is magnetized in the direction of the axis of said barrel bore.

3. The receptor of claim 1, wherein the magnet is magnetized in a direction transverse to said barrel bore and includes a diametrically extending gap bifurcating said magnet at the front face of said magnet in a direction perpendicular to the direction of magnetization.

4. The combination of claim 1 wherein the rim is of stainless steel.

5. In an explosive actuated stud driving tool having a barrel through which a stud is projected into a work surface, a receptor for positioning discs, washers and the like work pieces through which the stud is to be projected at the muzzle of the barrel comprising means for attaching said receptor at the muzzle of said barrel, a permanent magnetic insert orificed axially in alignment with the bore of said barrel and positioned ahead of said receptor attaching means, and means mounted on said attaching means for protectively holding said insert in sheathed relationship, said holding means including a nonmagnetic rim extending peripherally around the front face of said insert spaced from said orifice to define with said insert a recess for reception of a work piece therein and for retaining the work piece magnetically only when the work piece is fully seated in said recess.

6. The combination of claim 5 wherein the holding means is of stainless steel.

7. The combination of claim 5 wherein the attaching means includes an outwardly extending circumferential flange for abutment with said protective holding means.

8. In an explosive actuated stud driving tool having a barrel through which a stud is projected into a work surface, a receptor for positioning discs, washers and the like work pieces at the muzzle of said barrel comprising a permanent relatively brittle magnetic member mounted at said muzzle separate from said barrel and having an orifice in alignment with the bore of said barrel for passage of a stud through said member from one end to the other end of said member, means at said one end for replaceably attaching said receptor at the muzzle of said barrel, and non-magnetic standoff means having at least a portion adjacent said other end protruding ahead of said member and spaced radially from said orifice rim, said standoff means and member forming a recess at said other end opposite the muzzle of said barrel capable of magnetically retaining said pieces, said standoff means being of relative ductile character for providing a protective bumper guard for said magnetic member.

References Cited in the file of this patent

UNITED STATES PATENTS

| | | |
|---|---|---|
| 2,632,890 | Tietig | Mar. 31, 1953 |
| 2,645,772 | Walker | July 21, 1953 |
| 2,660,726 | Weingart | Dec. 1, 1953 |
| 2,705,323 | Bossong | Apr. 5, 1955 |

FOREIGN PATENTS

| | | |
|---|---|---|
| 744,822 | Great Britain | Feb. 15, 1956 |

UNITED STATES PATENT OFFICE

CERTIFICATION OF CORRECTION

Patent No. 2,957,175                           October 25, 1960

Robert W. Henning et al.

It is hereby certified that error appears in the above numbered patent requiring correction and that the said Letters Patent should read as corrected below.

Column 4, line 75, and column 5, line 1, after "at" strike out "said opposite end opposite" and insert the same after "at" in column 4, line 74.

Signed and sealed this 25th day of April 1961.

(SEAL)
Attest:

ERNEST W. SWIDER
Attesting Officer

DAVID L. LADD
Commissioner of Patents